United States Patent [19]

Maly

[11] 4,110,789

[45] Aug. 29, 1978

[54] PROCESS AND APPARATUS FOR THE EXACT DETERMINATION OF THE PERIODIC POSITION OF A TELEVISION VERTICAL SYNCHRONIZING SIGNAL

[75] Inventor: Hans-Peter Maly, Darmstadt, Germany

[73] Assignee: Robert Bosch GmbH, Stuttgart, Germany

[21] Appl. No.: 764,071

[22] Filed: Jan. 31, 1977

[30] Foreign Application Priority Data

Feb. 2, 1976 [DE] Fed. Rep. of Germany ....... 2604523

[51] Int. Cl.$^2$ .............................................. H04N 5/04
[52] U.S. Cl. ...................................... 358/148; 358/154
[58] Field of Search ......................... 358/148, 153, 154

[56] References Cited

U.S. PATENT DOCUMENTS 3,904,823  9/1975  Straaten ............................... 358/148
3,935,388  1/1976  Brinkmann ...................... 358/148 X Primary Examiner—Robert L. Richardson
Attorney, Agent, or Firm—Littlepage, Quaintance, Murphy, Richardson and Webner

[57] ABSTRACT

A digital system is disclosed for precisely located a television vertical sync signal. The precise location in time of a (k + 1)th pulse used for vertical synchronization is predicted, based on continuously observed past performance, as a function of time interval after the last or (k)th pulse used for horizontal synchronization.

6 Claims, 2 Drawing Figures

PROCESS AND APPARATUS FOR THE EXACT DETERMINATION OF THE PERIODIC POSITION OF A TELEVISION VERTICAL SYNCHRONIZING SIGNAL

BACKGROUND OF THE INVENTION

1. Field of the Invention

The invention is concerned with a process for accurately determining the periodic position in time of a television vertical synchronizing signal.

2. Description of the Prior Art

In order to attain synchronization between a recording unit and a play-back unit, it is customary in television technology to add a synchronizing signal to the picture signal. This synchronizing signal consists of two components: one component is used for horizontal synchronizing of the line deflection and the other component is used for vertical synchronizing of the picture deflection. The horizontal component consists of line frequency pulses whose pulse width, according to the German legal standards, is about 4.7 microseconds and whose series frequency is 15,625Hz (64 microseconds). The vertical component has a series frequency of 50Hz (20 milliseconds) and a pulse width of several line periods in duration.

Processes for separation of the vertical and horizontal synchronization signals are known. Generally the horizontal component is obtained through differentiation and the vertical component through integration. In this integration, the last horizontal sync pulse before the vertical sync pulse is used, and, thereby, its periodic condition relative to the waveform of the vertical sync pulse is also noticeable. This periodic interval differs from field to field by the almost exclusive application of the inter-line method. In order to prevent displaying changing different vertical impulses through the integration from field to field, a so-called equalizing signal is employed. This pre-equalizing signal is a pulse which occurs halfway between the last horizontal sync pulse and the vertical sync pulse and has a pulse repetition rate of 32 microseconds. In this way the ratios, before a vertical pulse begins, for each field are practically equal. In this way the vertical sync component can be separated at the receiver by simple means, without pairing of the play-back lines arising, which is the basis for achieving the separation of the vertical synchronization pulse from the synchronizing signal after both fields.

For digital transmission of the television picture, the periodic position in time of the vertical sync component in the television synchronizing signal must be very accurately determined. This is particularly true if the signal-to-noise ratio of the television synchronizing signal is small. Known processes (as in German Offenlegungsschrift No. 2,347,168) have the disadvantage that, with noisy television synchronizing signals, a side-jittering appears in separate vertical components.

SUMMARY OF THE INVENTION

The present invention relates to a process of the type discussed, which does not exhibit this disadvantage.

The inventive process has the advantage that the side-jittering observed in the known process is exactly determined through corresponding calculation of the side positions of the synchronizing pulse signal during the blanking intervals over several horizontal periods.

Additional advantages and details of the inventive process are further described in the following specifications and claims.

DESCRIPTION OF THE PREFERRED EMBODIMENT

Figure 1:
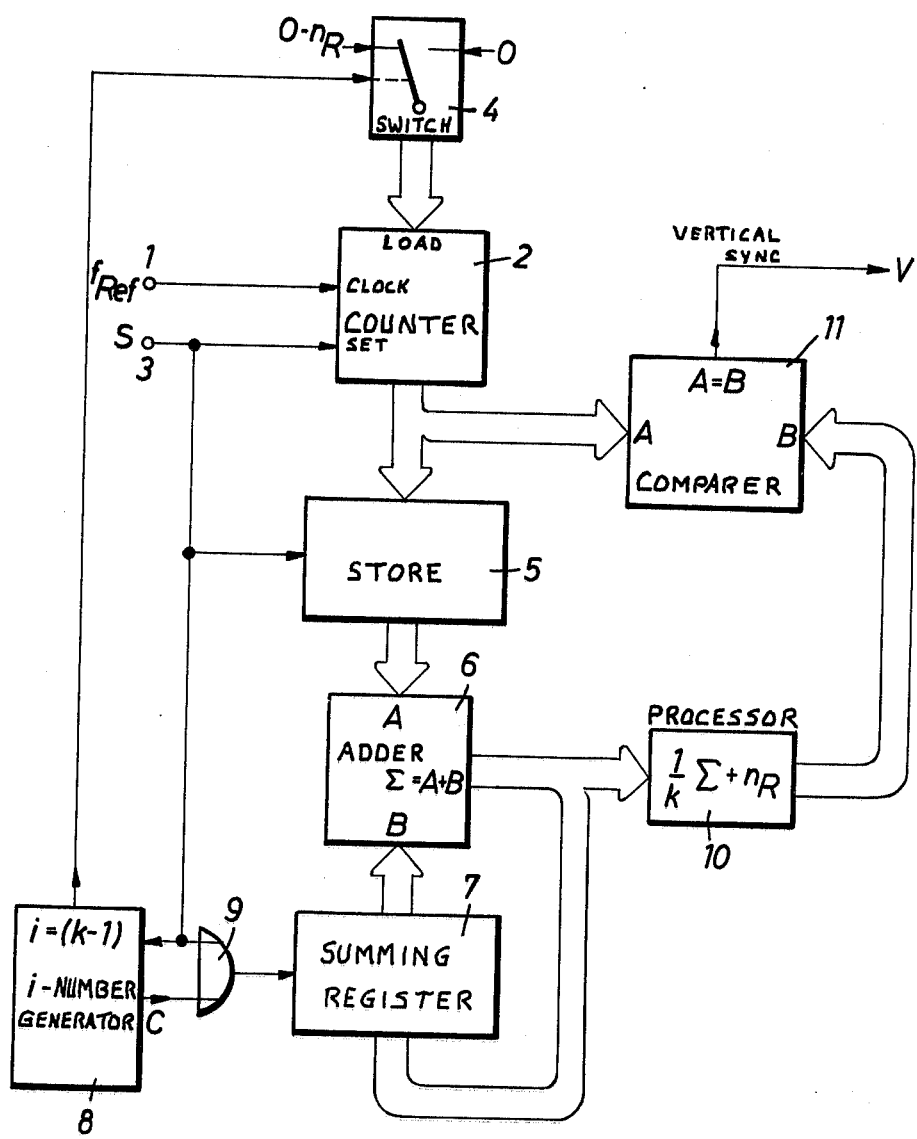
FIG. 1 is a voltage-time diagram in explanation of invention.

In the block diagram of FIG. 1, the frequency of horizontal reference signal $f_{Ref}$ at terminal 1 is counted with a counter 2. The frequency of the reference signal can be any even numbered multiple of the horizontal sweep frequency, but in the present example corresponds to the quadruple PAL-color carrier frequency, that is, 4 × 4.43361875 MHz. At the beginning of each counting run, the counter 2 is set by the negative edge of each equalizing pulse of the horizontal synchronizing pulse signal S at terminal 3. At the same time the counter 2 is loaded via a switch 4 with a particular pre-set number. This pre-set number is predetermined by the television system through the frequency of the reference signal and the preset pulse intervals in the television standard for the horizontal synchronizing signal. In the present example, the counter 2 is so loaded that it reaches a zero meter indication by counting out the reference signal frequency after 32 microseconds. If the meter indicator of counter 2 deviates from zero or null after the 32 microsecond counting period, one obtains the difference $n_R - \Delta n_i$. This difference is used for the solution of the equation $$\Delta N_v = n_R + \frac{1}{k} \sum_{i=1}^{k-1} i(n_R - \Delta n_i) \tag{1}$$

in a corresponding switching arrangement.

Figure 2:
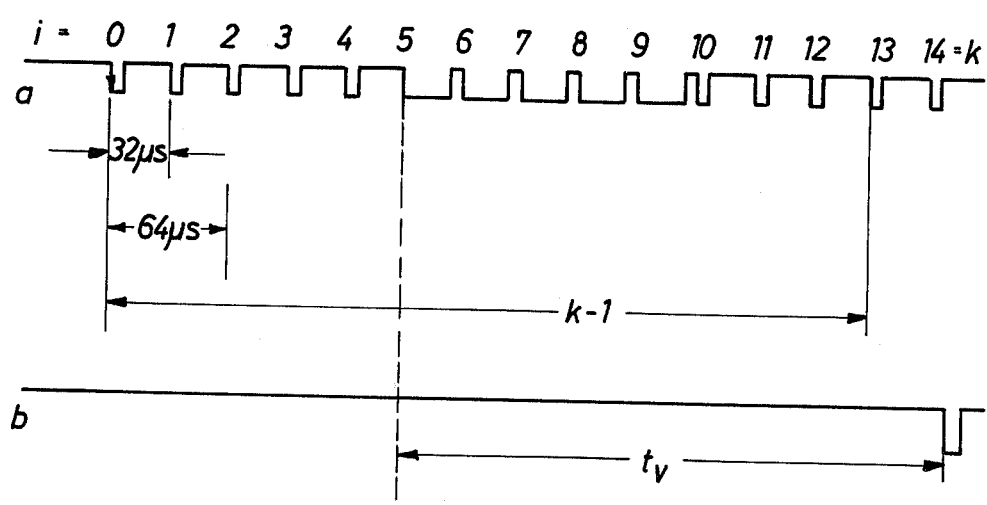
FIG. 2 is a voltage-time diagram in explanation of the invention.

The above equation (1) is explained as follows: It is known that the vertical component of the television synchronizing signal is a function of the $k + 1$ negative equalizing pulse edges shown in FIG. 2a. Furthermore, it is known that the calculated pulse, which determines the exact periodic position of the vertical component in the television synchronizing signal, should lie in the area of kth equalizing pulse edge. The interval (according to the German television norm preset at 32 microseconds) between the negative equalizing pulse edges corresponds to a preset number $n_R$ of the frequency of the reference signal. If a counter for counting the frequency of the reference signal is started with the negative edge at $i=0$, then the respective meter indications, $n_i$ ($i=1,2 \ldots, k-1$), occurring with each following negative equalizing pulse edge can be determined. The meter indication $N_V$ for the pulse to be calculated, which determines the exact periodic position of the vertical component in a television synchronizing signal, is determined using the arithmetic average value of the individual meter indications $n_i$, which at the appropriate time will be supplied with the missing multiples of $n_R$ $$N_v = \frac{1}{k} [k \cdot n_R + \sum_{i=1}^{k-1} (n_i + (k-i)n_R)] \tag{2}$$

For solution of equation (2), the following expressions are introduced:

$$\Delta n_i = n_i - n_{i-1} \quad n_i = \sum_{t=1}^{i} \Delta n_t \quad (3)$$

Thus, a counter which is begun at first with zero and runs through to an edge $k$ is newly started at each negative edge. It will count out only the intervals $\Delta n_i$ between two negative equalizing pulse edges. For further simplification, the meter indication $N_V$ also should not be calculated, but the meter indication $\Delta N_V$, whose reference is the $(k-1)$th edge, is calculated. The meter indication $N_V$ gives the position of a pulse which determines the exact periodic location of the vertical component in the television synchronizing signal, in relation to the position of the Zeroith edge.

Thus the following equation is obtained:

$$\Delta N_v = N_v - n_{k-1} = N_v - \sum_{i=1}^{k-1} \Delta n_i \quad (4)$$

By substituting the equations (2) and (3) in equation (4), one obtains the following expression:

$$\Delta N_v = n_R + \frac{1}{k} \sum_{i=k}^{k-1} [\sum_{t=1}^{i} \Delta n_t = (k-1)n_R - k\Delta n_i]$$

Additional rearrangement leads to the formula (1) given in the introduction:

$$\Delta N_v = n_R + \frac{1}{k} \sum_{i=1}^{k-1} i(n_R - \Delta n_i)$$

The meter indication of the counter 2 is transmitted to a storage unit 5, which can comprise a plurality of D-flip-flops, and there stored fo the duration of the 32 microseconds. The values corresponding to the negative equalizing pulse edges stored in the storage unit 5 are summed up $i$ times with an addition unit 6. Then the output value is transmitted from the outlet of the addition unit 6 into a sum register 7, through which, after corresponding control by a control unit 8, the multiplication by $i$ takes place. After $k-1$ equalizing pulse edges ($k$ is given the value 14 in this example) the value $$\sum_{i=1}^{k-1} i(n_R - \Delta n_i)$$

at the outlet of the addition unit 6 is obtainable. In a processing stage 10, the value obtainable at the outlet of the addition unit 6 is divided by $k$ and increased by the number $n_R$. Thus, at the outlet of the processing stage 10, there is a value obtainable which satisfies the equation (1). This value is compared with a value at the outlet of counter 2 using a comparer 11. Upon reaching the $k-1$ equalizing pulse edge, the counter is loaded wih zero via switch 4. Using data comparison, the comparer 11 supplies a pulse (FIG. 2b) which determines the exact periodic position of the vertical component in the television synchronizing signal (when A=B) determined at the time $t_v$. The broadly drawn connections between the individual blocks in FIG. 1 are intended to characterize the simultaneous transmission of more digital values. The processing stage 10 is advantageously realized with a continuous value storage unit.

What is claimed is:

1. A method for exact determination of the periodic position of the vertical component of a television synchronizing signal by using the expression:

$$\Delta N_v = n_R + \frac{1}{k} \sum_{i=1}^{k-1} i(n_R - \Delta n_i)$$

wherein $\Delta N_V$ = the number of periods of a reference signal ($f_{Ref}$) counted from the $k-1$ negative synchronizing pulse edge after the characteristic pulse is generated until the position of the vertical component, $n_R$ = the number of periods of the reference signal during the time interval between two successive synchronizing pulses, $k$ = the number of negative synchronizing pulse edges which are brought up for evaluation, $i$ = functional variable, $i = 1, 2, \ldots, k-1$, and $\Delta n_i$ = the number of periods of the reference signal in the time interval from the $i-1$ to the $i$-th negative synchronizing pulse edge, comprising the steps of:

A. counting the period of the reference signal with a counter for determining in the time interval the frequency of the two synchronizing pulses relative to the number of correct preset periods of the reference signal in the same time interval, B. storing the value of the period number thus determined in a storage unit for the duration of the time interval of the two synchronizing pulses, C. providing said value to an addition unit to sum up the corresponding $i$ periodic numbers after the functional variable $i$ has gone $i$ times, the output value at an output terminal of the addition unit being $$\sum_{i=1}^{k-1} i(n_R - \Delta n_i)$$

D. dividing said output in a subsequent processing stage by the number $k$ of evaluated time intervals between the synchronizing pulses and increasing the quotient by the number $n_R$ of correct preset periods of the reference signal in a time interval between two synchronizing pulses, and E. comparing the value obtainable at the outlet of the processing unit, which is $$\Delta N_v = n_R + \frac{1}{k} \sum_{i=1}^{k-1} i(n_R - \Delta n_i)$$

in a comparer with the value at the outlet of the counter (which is loaded at the time $k-1$ with a value of zero) to derive the time position of a characteristic pulse of the vertical sync component by means of comparison.

2. A method according to claim 1 wherein, in a control unit located away from the television synchronizing signal, a characterizing pulse for the functional variable $i$ is determined for the addition unit and a characterizing pulse for the functioning variable $i = k-1$ is determined for control of the loading of the counter.

3. A method according to claim 1 wherein an even numbered multiple of a horizontal sweep frequency is chosen as the frequency of the reference signal.

4. A method according to claim 1 wherein the quadruple of the PAL-color carrier frequency is chosen for the frequency of the reference signal.

5. A system for exact determination of the periodic position of the vertical component of a television synchronizing signal by using the expression:

$$\Delta N_v = n_R + \frac{1}{k} \sum_{i=1}^{k-1} i(n_R - \Delta n_i)$$

wherein $\Delta N_V$ = the number of periods of a reference signal ($f_{Ref}$) counted from the $k-1$ negative synchronizing pulse edge after the characteristic pulse is generated until the position of the vertical component, $n_R$ = the number of periods of the reference signal during the time interval between two successive synchronizing pulses, $k$ = the number of negative synchronizing pulse edges which are brought up for evaluation, $i$ = functional variable, $i = 1, 2, \ldots, k-1$, and $\Delta n_i$ = the number of periods of the reference signal in the time interval from the $i-1$ to the $i$-th negative synchronizing pulse edge, comprising:

A. counter means for counting the period of the reference signal for determining in the time interval the frequency of the two synchronizing pulses relative to the number of correct preset periods of the reference signal in the same time interval, B. storage unit for storing the value of the period number thus determined for the duration of the time interval of the two synchronizing pulses, C. an addition unit for summing up the corresponding $i$ periodic number after the functional variable $i$ has gone $i$ times, the output value at an output terminal of the addition unit being $$\sum_{i=1}^{k-1} i(n_R - \Delta n_i)$$

D. a divider for dividing said output by the number $k$ of evaluated time intervals between the synchronizing pulses and increasing the quotient by the number $n_R$ of correct preset periods of the reference signal in a time interval between two synchronizing pulses, and E. comparer for comparing the value obtainable at the outlet of the divider, which is $$\Delta N_v = n_R + \frac{1}{k} \sum_{i=1}^{k-1} i(n_R - \Delta n_i)$$

with the value at the outlet of the counter means (which is loaded at the time $k-1$ with a value of zero) to derive the time position of a characteristic pulse of the vertical component by means of comparison.

6. A system according to claim 5 wherein the storage unit comprises D-flip-flops.

* * * * *